United States Patent
Myers et al.

(10) Patent No.: US 8,513,149 B2
(45) Date of Patent: Aug. 20, 2013

(54) METHOD FOR DRYING REGENERATED CATALYST IN ROUTE TO A PROPANE DEHYDROGENATION REACTOR

(75) Inventors: David N. Myers, Hoffman Estates, IL (US); Daniel N. Myers, Arlington Heights, IL (US); Paolo Palmas, Des Plaines, IL (US); Laura E. Leonard, Western Springs, IL (US); Wolfgang A. Spieker, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 331 days.

(21) Appl. No.: 12/871,277

(22) Filed: Aug. 30, 2010

(65) Prior Publication Data
US 2012/0053047 A1   Mar. 1, 2012

(51) Int. Cl.
*B01J 21/20* (2006.01)
*B01J 23/90* (2006.01)
*B01J 25/04* (2006.01)
*B01J 27/28* (2006.01)
*B01J 29/90* (2006.01)
*B01J 31/40* (2006.01)
*B01J 38/00* (2006.01)
*B01J 38/04* (2006.01)
*B01J 38/12* (2006.01)
*B01J 38/40* (2006.01)

(52) U.S. Cl.
USPC ............. 502/38; 502/20; 502/34; 502/39

(58) Field of Classification Search
USPC ................................................ 502/20–56
See application file for complete search history.

(56) References Cited

U.S. PATENT DOCUMENTS

| | | | | |
|---|---|---|---|---|
| 4,939,314 A | * | 7/1990 | Harandi et al. | 585/533 |
| 4,952,543 A | * | 8/1990 | Huang et al. | 502/35 |
| 5,059,305 A | * | 10/1991 | Sapre | 208/113 |
| 6,362,385 B1 | | 3/2002 | Iezzi et al. | |
| 7,235,706 B2 | | 6/2007 | Iezzi et al. | |
| 7,273,543 B2 | * | 9/2007 | Letzsch | 208/113 |
| 7,423,191 B2 | | 9/2008 | Senetar | |
| 2002/0183403 A1 | | 12/2002 | Huang | |
| 2008/0097134 A1 | | 4/2008 | Fridman et al. | |
| 2008/0161624 A1 | | 7/2008 | Glover et al. | |
| 2009/0012341 A1 | | 1/2009 | Brophy et al. | |
| 2009/0240094 A1 | | 9/2009 | Crone et al. | |
| 2009/0325783 A1 | | 12/2009 | Myers | |
| 2010/0105540 A1 | | 4/2010 | Galliou | |

FOREIGN PATENT DOCUMENTS

| | | |
|---|---|---|
| CN | 1912065 A1 | 2/2007 |
| RU | 2214383 C1 | 10/2003 |

OTHER PUBLICATIONS

U.S. Appl. No. 12/871,296, filed Aug. 30, 2010, Myers et al.

* cited by examiner

*Primary Examiner* — Kaj K Olsen
*Assistant Examiner* — Jennifer Smith
(74) *Attorney, Agent, or Firm* — Arthur E Gooding

(57) ABSTRACT

An apparatus and process are presented for drying a catalyst in a reactor-regenerator system. The process includes a continuous operating system with catalyst circulating between a reactor and regenerator, and the catalyst is dried before returning the catalyst to the reactor. The process uses air that is split between the drying stage and the combustion stage without adding equipment outside of the regenerator, minimizing energy, capital cost, and space requirements.

5 Claims, 1 Drawing Sheet

METHOD FOR DRYING REGENERATED CATALYST IN ROUTE TO A PROPANE DEHYDROGENATION REACTOR

FIELD OF THE INVENTION

This invention relates to an apparatus and process in catalytic hydrocarbon processing. In particular, this invention relates to improving regenerators, and the process of regenerating catalyst.

BACKGROUND OF THE INVENTION

There are many processes that have been developed for converting hydrocarbon streams to more useful products. Many of these processes involve the use of catalysts, and many of the catalytic processes are continuously operated. The continuous operation of a catalytic process can involve a fluidized bed reactor, and a regenerator. The catalyst is used in the reactor, and is continuously drawn off as spent catalyst and passed to a regenerator. The regenerator regenerates the spent catalyst and recycles the catalyst back to the reactor.

One common process, as an example, is fluid catalytic cracking. The process is a conversion process to convert heavy hydrocarbons into lighter hydrocarbons. The reaction occurs through contact between the hydrocarbon stream of heavy hydrocarbons with catalyst particles. The particles eventually lose their activity, and need to be regenerated. The basic components of such a process includes a reactor, a catalyst stripper and a regenerator. The reaction takes place in the reactor, where the catalyst is eventually deactivated through the accumulation of coke on the catalyst particles. The catalyst is carried out of the reactor, where residual hydrocarbons are stripped from the catalyst, and the catalyst is passed to the regenerator, where the coke is burned off, and the catalyst is regenerated.

However, some processes using this basic structure may require additional steps to maintain the long term viability of the continuous process.

BRIEF SUMMARY OF THE INVENTION

The present invention is a process for catalyst drying in a paraffin dehydrogenation system. The process involves drying the catalyst during the regeneration cycle in a circulating reactor regeneration system. The process includes passing spent catalyst from a reactor to a regenerator. The catalyst is regenerated through combustion of the coke on the catalyst in a combustion chamber with air passed to the combustion chamber for the combustion. The regenerated catalyst is separated from the combustion gas and a drying gas is passed over the catalyst in a drying chamber in the regenerator. The dried and regenerated catalyst is passed to a stripping chamber where the catalyst is contacted with a dry inert gas to remove residual oxygen. The regenerated, dried and stripped catalyst is then passed back to the reactor.

In another embodiment, the process involves passing the regenerated catalyst to a drying chamber that is positioned below the combustion chamber. The drying gas is passed through the drying chamber, and the moist gas is passed to the combustion chamber and used in the process of removing the coke on the catalyst. The regenerated catalyst is separated from the combustion gas and passed to the drying chamber, and then passed to a stripping chamber. In the stripping chamber, a dry inert gas is contacted with the dried, regenerated catalyst to remove residual oxygen on the catalyst. The inert gas can be passed to the drying chamber to further aid in the drying of the catalyst.

Other objects, advantages and applications of the present invention will become apparent to those skilled in the art from the following detailed description and drawings.

DETAILED DESCRIPTION OF THE INVENTION

Figure 2:
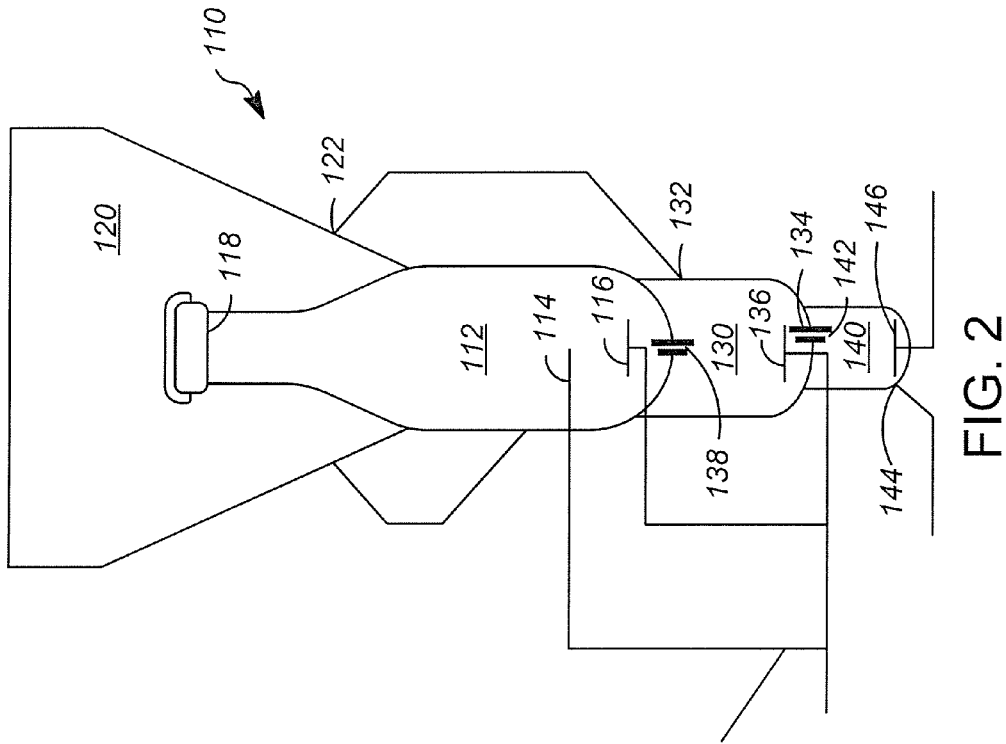
FIG. 2 is a second configuration for performing the catalyst drying.

Propylene is an important precursor to the plastic polypropylene. A process has been developed to produce on-purpose propylene from a propane rich feedstock. The process of the present invention involves the dehydrogenation of propane using a non-noble metal catalyst in a fluidized reactor-regenerator system. However, depending upon which catalyst type is chosen, sensitivity of the catalyst to water can be an issue, and the regeneration process produces some moisture that can be adsorbed onto the regenerated catalyst. The dehydrogenation process comprises passing a paraffinic hydrocarbon to a dehydrogenation reactor. In the reactor, a dehydrogenation catalyst is circulated between the reactor and a regenerator for a continuous process, wherein the catalyst undergoes deactivation while in the reactor during the dehydrogenation process, and is regenerated in a regenerator and returned to the reactor. In particular, the design of the present invention is aimed at the process of converting propane to propylene. In addition, the presence of oxygen and/or carbon monoxide affects the dehydrogenation process. The residual oxygen and/or carbon monoxide that is adsorbed on the catalyst during regeneration needs to be removed. Simple purging of the catalyst from the regenerator is often insufficient to remove enough of the residual water to return the catalyst to a state to achieve the desired performance.

The present invention represents an integrated catalyst regeneration and drying approach which is an improvement over a non-integrated approach where an additional drying vessel would be employed requiring additional complexity, and operation equipment and plot space. This invention reduces capital cost by avoiding the addition of a non-integrated dedicated drying system which would require catalyst handling and gas/catalyst separation equipment. The regenerated catalyst is contacted with a dry gas such as air or nitrogen to remove more than 90% of the water adsorbed by the catalyst in the regenerator, and preferably more than 99.9% of the water. The extent of drying is determined by the level of activity needed in the regenerated catalyst.

The present invention is intended to include any reactor design that incorporates a recirculation of the catalyst between a reactor and a regenerator, including a fluidized bed system, a fast fluidized bed system, a bubbling bed reactor system, or a counter-current flow system involving trays or packing One embodiment of the present invention is a process for drying regenerated catalyst in a continuous catalyst regeneration system. The process includes passing spent catalyst from a dehydrogenation reactor to a regenerator. The catalyst is regenerated through the combustion of coke deposits on the catalyst to return the catalyst to an active state. In a regenerator, the catalyst is subject to heating and an oxidizing gas. The combustion of the coke provides the heating of the catalyst.

Additional fuel can be added to the regenerator to insure sufficient heating and combustion of the coke on the catalyst. The catalyst is carried out of the combustor style regenerator with the combustion gas effluent. The catalyst and combustion gas effluent are partially separated, and the regenerated catalyst settles in a dryer positioned at the outlet of the regenerator, forming a dense bed of catalyst in the dryer. Water is generated in the combustion process and adsorbed onto the catalyst. A drying gas is passed to the dryer and flows over the catalyst in a fluidized bed to remove adsorbed water. The fluidized bed can be a bubbling bed, or other fluidized bed wherein the catalyst is well mixed with the drying gas, and the catalyst flows through the bed as it is dried.

In another embodiment, the process further includes passing the dried catalyst to a stripping unit thereby creating a stripped and dried catalyst that is passed to the reactor. A stripping gas is passed to the stripping unit to remove residual oxygen on the catalyst. The stripping gas can be any inert gas, such as nitrogen, or other inert gas, or a mixture of inert gases.

Figure 1:
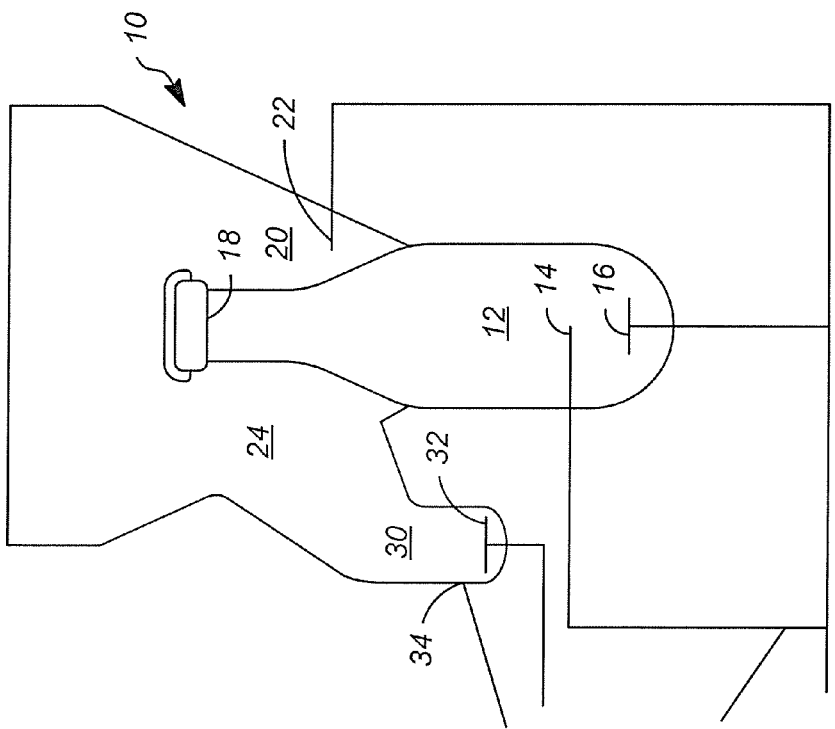
FIG. 1 is a first configuration for performing the catalyst drying.

In this embodiment, the process can be shown in the apparatus of FIG. 1. The apparatus is a regenerator 10 includes a combustion chamber 12, having a catalyst inlet 14 for admitting spent catalyst, a combustion gas inlet 16, and an outlet 18 for conveying catalyst and effluent gas. The apparatus 10 further includes a drying chamber 20, having a drying gas inlet 22, and a catalyst outlet 24. The catalyst from the combustion chamber 12 disengages from the effluent gas as it enters the upper section of the regenerator 10 where the catalyst settles into the drying chamber 20. Drying gas flows over the catalyst and displaces residual combustion gases, and water that has adsorbed onto the catalyst. The catalyst in the drying chamber 20 is in a fluidized bed and flows into a stripping chamber 30. The stripping chamber 30 has a stripping gas inlet 32 and a catalyst outlet 34, where the catalyst is passed to a reactor. The stripping gas can mix with the effluent gases from the combustion chamber 12 and from the drying chamber 20 to be passed out to the atmosphere or other venting means of disposing of the gas.

The regenerator 10 can include gas distributors attached to the gas inlets for the different chambers. The gas distributors will facilitate mixing of the catalyst and gases in the respective chambers, and are positioned near the bottom of each respective chamber to minimize or eliminate any zones where the catalyst can collect and sit without passing through the regenerator 10.

The drying gas and combustion gas can be dried air, and can originate from a common source. The air for combustion in the regenerator is supplied by a main air blower, and can be sized to accommodate additional capacity for the dryer 20. A portion of the air for the combustion gas can also be used to lift the catalyst into the combustion chamber 12, entering through the spent catalyst inlet 14.

The drying chamber 20 can comprise a series of trays that can be stacked for distributing and flowing the catalyst across the trays and down the stack. This provides for good contact with drying gas flowing up through the tray stack and contacting the catalyst. The drying gas then mixes with the effluent gas from the combustion chamber 12 and is passed out of the regenerator 10. In an alternate arrangement, the drying chamber 20 can comprise a packing material. The packing material will consist of large open packing objects that allows for the free flow of catalyst down through the packing material, while drying gas flows up through the packing material.

In one embodiment, the drying chamber 20 comprises an annular region around the upper section of the combustion chamber 12. The drying gas is passed through a distributor that distributes the gas around the annular region. The annular bed can be a fluidized bed, or a drying chamber with annular trays or packing In another embodiment, the invention comprises a process for drying regenerated catalyst in a continuous catalyst regeneration system. The process includes passing spent catalyst form a dehydrogenation reactor to a regenerator. The catalyst is regenerated in a combustion regeneration process to remove coke deposits on the catalyst, and generates a stream of regenerated catalyst and combustion gas effluent. The regenerated catalyst is separated from the combustion gas, and the regenerated catalyst is passed to a dryer. The dryer is positioned proximate to the combustion chamber gas inlet. The gas for drying the catalyst flows through the dryer, thus drying the catalyst, and passes to the combustion chamber wherein the gas is used to burn the coke off the catalyst. A dried catalyst stream passes to a stripper, and the dried catalyst is contacted with a stripping gas to remove residual oxygen on the catalyst. The stripping gas after flowing over the catalyst is passed to the drying chamber to contribute to the drying of the catalyst. The regenerated, dried and stripped catalyst is then passed to the reactor.

This embodiment is illustrated in the apparatus shown in FIG. 2. The apparatus is a regenerator 110 that includes a combustion chamber 112 with a catalyst inlet 114, a combustion gas inlet 116 and an outlet 118 for carrying catalyst and effluent gas. The apparatus includes a separation chamber 120 in fluid communication with the combustion chamber outlet 118. The separation chamber 120 has a catalyst outlet 122 and an effluent gas outlet. The apparatus further includes a drying chamber 130 with a catalyst inlet 132 in fluid communication with the separation chamber catalyst outlet 122, a catalyst outlet 134, a drying gas inlet 136, and a gas outlet 138 for the dryer effluent gas. The dryer gas outlet 138 is in fluid communication with the combustion chamber 112, and the dryer gas can be used in the combustion process in the combustion chamber 112. The apparatus further includes a stripping chamber 140 having a catalyst inlet 142 in fluid communication with the dryer catalyst outlet 134, a catalyst outlet 144, a stripper gas inlet 146, and an effluent gas outlet in fluid communication with the dryer 130.

The gas inlets in the respective chambers can include gas distributors attached to the inlets for distribution of the gas in the respective chambers. The stripping gas which is passed to the dryer, can be passed to a distributor, or passed to the dryer gas inlet and mixed with the drying gas. The drying gas is air and after drying the catalyst is passed to the combustion chamber where it is used in the combustion process. The combustion gas can be passed either entirely through the dryer 130 before being passed to the combustion chamber 112, or can be split with a portion passed through the drying chamber 130 and a portion passed directly to the combustion chamber 112. In this embodiment, a single air source provides the air for combustion and drying, and where the drying air is used in the combustion process without the need for additional air.

In this process, and regenerator design, the drying gas, stripping gas, and combustion chamber flue gases are combined and no additional conduits are required.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for drying regenerated catalyst in a continuous catalyst regeneration system, comprising:
    passing spent catalyst from a reactor to a regenerator;
    regenerating the catalyst through a combustion regeneration process in a combustion chamber, thereby creating catalyst effluent stream comprising a regenerated catalyst and a combustion gas comprising water;
    separating the regenerated catalyst from the combustion gas;
    passing the regenerated catalyst to a dryer, wherein the dryer is positioned proximate to the combustion inlet, and contacting the regenerated catalyst with dry air, thereby creating a effluent air stream and a dry catalyst stream;
    passing the effluent air stream to the regenerator;
    passing the dry catalyst stream to a stripper;
    passing a dry inert gas to the stripper to contact the dry catalyst stream, wherein a stripper effluent stream is generated; and
    passing the stripper effluent stream to the dryer.

2. The process of claim 1 wherein the catalyst from the stripper is passed to the reactor.

3. The process of claim 1 wherein the inert gas passes through the stripper to the dryer.

4. The process of claim 1 wherein the drying gas passes through the dryer to the regenerator and is used in the combustion process for regeneration of the catalyst.

5. A dehydrogenation catalyst regeneration process comprising:
    passing a paraffinic hydrocarbon stream to a dehydrogenation reactor:
    contacting the paraffinic hydrocarbon stream with a dehydrogenation catalyst, thereby creating an effluent stream comprising olefins, and an effluent stream comprising spent catalyst;
    passing the spent catalyst to a regenerator;
    passing combustion air to the regenerator;
    combusting carbon deposits on the spent catalyst, thereby creating an effluent stream comprising combustion gas effluent and regenerated catalyst;
    separating the regenerated catalyst from the combustion gas effluent, thereby creating a regenerated catalyst stream and a combustion gas stream;
    passing the regenerated catalyst to a dryer;
    passing a dry air stream to the dryer;
    contacting the dry air with the regenerated catalyst to create a dry regenerated catalyst stream and an effluent gas stream;
    passing the effluent gas stream to the regenerator, wherein the effluent gas stream is used to combust with the carbon deposits on the spent catalyst;
    passing the dry regenerated catalyst to a stripper;
    passing an inert gas to the stripper to strip the catalyst of adsorbed oxygen, thereby creating a stripped regenerated catalyst, and a stripper gas effluent, wherein the stripper gas effluent is passed to the dryer; and
    passing the stripped regenerated catalyst to the dehydrogenation reactor.

* * * * *